United States Patent
Panteleev et al.

(10) Patent No.: US 11,985,670 B2
(45) Date of Patent: May 14, 2024

(54) MODE-1 DOWNLINK CONTROL INFORMATION TRANSMISSION-RECEPTION FOR CONFIGURED SIDELINK SCHEDULING IN NR V2X

(71) Applicant: Intel Corporation, Santa Clara, CA (US)

(72) Inventors: Sergey Panteleev, Nizhny Novgorod (RU); Alexey Khoryaev, Nizhny Novgorod (RU); Mikhail Shilov, Nizhny Novgorod (RU); Kilian Roth, Munich (DE); Dmitry Belov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 258 days.

(21) Appl. No.: 17/175,401

(22) Filed: Feb. 12, 2021

(65) Prior Publication Data

US 2021/0168852 A1 Jun. 3, 2021

Related U.S. Application Data

(60) Provisional application No. 62/976,297, filed on Feb. 13, 2020.

(51) Int. Cl.
*H04L 5/00* (2006.01)
*H04W 72/23* (2023.01)
*H04W 76/14* (2018.01)

(52) U.S. Cl.
CPC ........... *H04W 72/23* (2023.01); *H04L 5/0055* (2013.01); *H04L 5/0098* (2013.01); *H04W 76/14* (2018.02)

(58) Field of Classification Search
None
See application file for complete search history.

(56) References Cited

U.S. PATENT DOCUMENTS

| | | | | |
|---|---|---|---|---|
| 2013/0242751 A1* | 9/2013 | Li | ............... | H04W 72/23 370/329 |
| 2019/0342911 A1* | 11/2019 | Talarico | ............... | H04L 5/0098 |
| 2020/0229237 A1* | 7/2020 | Kim | ............... | H04W 74/0833 |
| 2020/0374937 A1* | 11/2020 | Kim | ............... | H04W 74/0833 |

(Continued)

OTHER PUBLICATIONS

3GPP, "3rd Generation Partnership Project; Technical Specification Group Radio Access Network; NR; Study on Vehicle-to-Everything (Release 16)", Mar. 2019, 122 pages.

(Continued)

*Primary Examiner* — Edan Orgad
*Assistant Examiner* — Emmanuel K Maglo
(74) *Attorney, Agent, or Firm* — Schwabe, Williamson & Wyatt, P.C.

(57) ABSTRACT

Various embodiments of the present disclosure may be used to determine how activation downlink control information (DCI), release DCI, and dynamic retransmission DCI are distinguished for DCI formats 3_0/3_1 for Mode-1 sidelink resource allocation. Furthermore, in case of asynchronous downlink (DL) and sidelink (SL) carriers, embodiments of the present disclosure may be used to determine how a user equipment (UE) determines transmission slots with respect to system frame number (SFN) or direct frame number (DFN) when activated with Type 1 configured scheduling.

8 Claims, 7 Drawing Sheets

(56) References Cited

U.S. PATENT DOCUMENTS

| | | | |
|---|---|---|---|
| 2021/0028891 A1* | 1/2021 | Zhou | H04W 4/40 |
| 2021/0029772 A1* | 1/2021 | Islam | H04W 72/23 |
| 2021/0045181 A1* | 2/2021 | Li | H04L 5/0016 |
| 2021/0144686 A1* | 5/2021 | Fakoorian | H04L 5/0053 |
| 2021/0160854 A1* | 5/2021 | Qu | H04L 5/0005 |
| 2021/0227517 A1* | 7/2021 | Yi | H04W 72/23 |
| 2021/0227622 A1* | 7/2021 | Kung | H04W 72/20 |
| 2021/0250772 A1* | 8/2021 | Farag | H04W 16/02 |

OTHER PUBLICATIONS

3GPP, "RP-190766, New WID on 5G V2X with NR sidelink", LG Electronics, Huawei, Mar. 18-21, 2019, 8 pages, Shenzhen, China.

* cited by examiner

500

Retrieving, from memory, downlink control information (DCI) associated with a configured grant sidelink transmission by a user equipment (UE), wherein the DCI includes an indication of an activation or release of a sidelink resource
505

Encoding a message for transmission to the UE that includes the DCI scrambled by a sidelink-configured scheduling-radio network temporary identifier (SL-CS-RNTI)
510

FIG.5A

520 

Determining downlink control information (DCI) associated with a configured grant sidelink transmission by a user equipment (UE), wherein the DCI includes an indication of an activation or release of a sidelink resource
525

Encoding a message for transmission to the UE that includes the DCI scrambled by a sidelink-configured scheduling-radio network temporary identifier (SL-CS-RNTI)
530

FIG. 5B

540 

Receiving a message that includes downlink control information (DCI) associated with a configured grant sidelink transmission, wherein the DCI is scrambled by a sidelink-configured scheduling-radio network temporary identifier (SL-CS-RNTI), and wherein the DCI includes an indication of an activation or release of a sidelink resource
545

Encoding a physical sidelink shared channel (PSSCH) or physical sidelink control channel (PSCCH) message for transmission based on the DCI
550

FIG. 5C

MODE-1 DOWNLINK CONTROL INFORMATION TRANSMISSION-RECEPTION FOR CONFIGURED SIDELINK SCHEDULING IN NR V2X

CROSS REFERENCE TO RELATED APPLICATION

The present application claims priority to U.S. Provisional Patent Application No. 62/976,297, which was filed Feb. 13, 2020; the disclosure of which is hereby incorporated by reference.

FIELD

Embodiments relate generally to the technical field of wireless communications.

BACKGROUND

3GPP RAN finalized the Study Item (SI) on NR-V2X and approved a new Work Item (WI) to develop the corresponding specifications for 5G V2X, especially the sidelink (SL) part based on NR.

NR V2X supports gNB controlled sidelink resource allocation mode. Most of the functionality have been defined already and some open issues were identified are pending design of proper solution. Such issues include details of DCI design for both dynamic scheduling and configured scheduling (w/semi-static signaling for configuration of sidelink transmission).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 5A, 5B, and 5C illustrate examples of operation flow/algorithmic structures in accordance with some embodiments.

DETAILED DESCRIPTION

Figure 1:
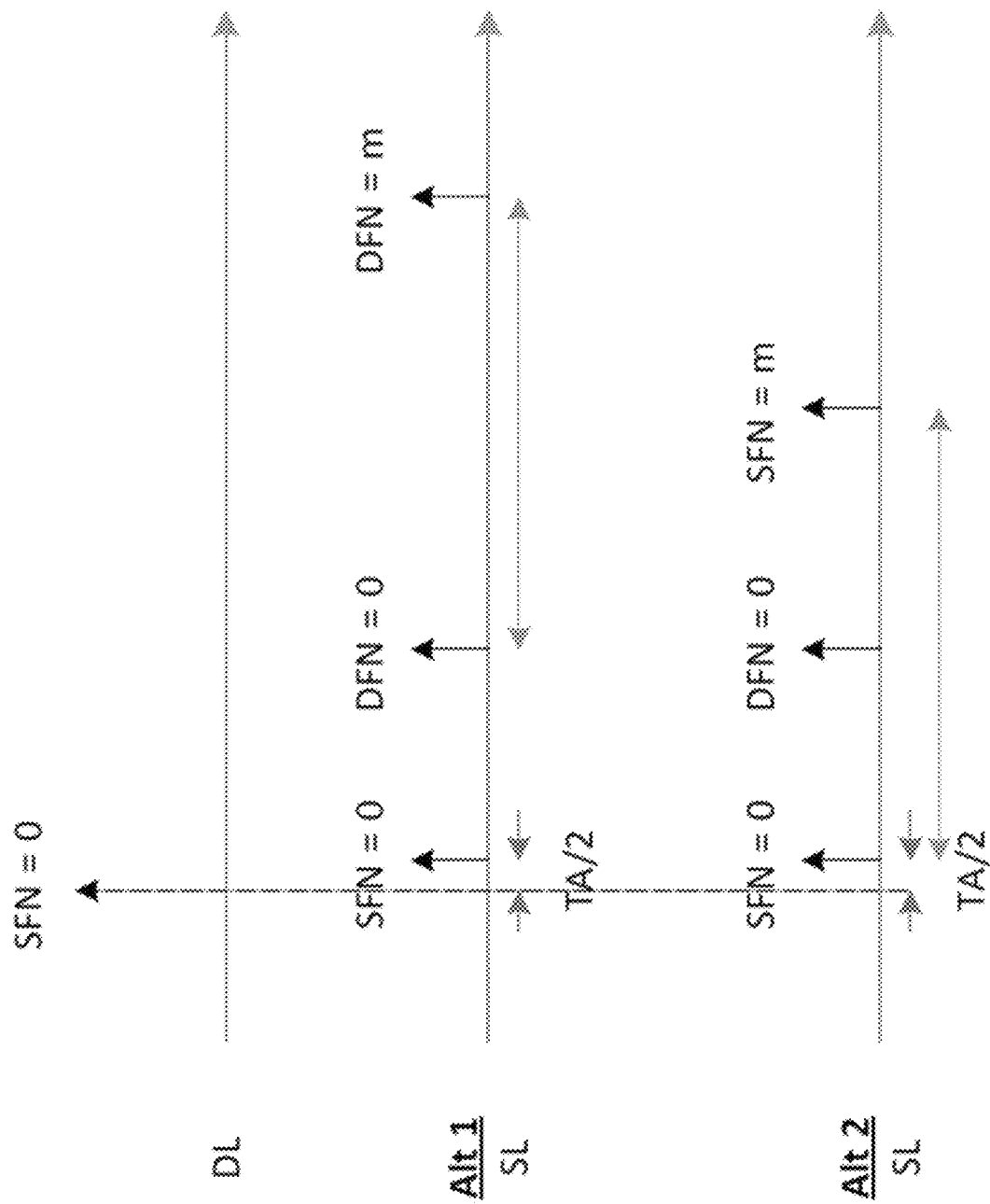
FIG. 1 illustrates an example of reference downlink timing in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Among other things, embodiments of the present disclosure may be directed to the following aspects of Mode-1 DCI design: (1) determination of activation, release, and dynamic grant DCI scrambled by SL-CS-RNTI; and (2) determination of configured sidelink slots for Type 1 configured sidelink scheduling.

Embodiments of the present disclosure may be used to determine how activation DCI, release DCI, and dynamic retransmission DCI are distinguished for DCI formats 3_0/3_1 for Mode-1 sidelink resource allocation. Furthermore, in case of asynchronous DL and SL carriers, embodiments of the present disclosure may be used to determine how a UE determines transmission slots with respect to SFN or DFN when activated with Type 1 configured scheduling.

Activation/Deactivation DCI 3_0/3_1 for Configured SL Scheduling

For configured grant Type 2, embodiments of the present disclosure may be used to determine how activation, release, and retransmission grant are distinguished.

First, activation/release scrambled with SL-CS-RNTI and dynamic grant scrambled with SL-CS-RNTI can be distinguished by a value of NDI, as it is done in LTE/NR Uu. In this case, NDI=0 is treated as activation/release and NDI=1 is treated as ReTX grant.

Further, in order to distinguish activation and release the following options are considered:

Option A. an invalid state of one of the fields may be used. At this stage, there is no obvious candidate field which has an invalid state.

Option B. different state of a field unused in case of SL-CS-RNTI. Such a field can be HARQ ID, if it is unused in case of dynamic retransmission scheduling.

Option C. a new 1-bit flag to distinguish activation and release. Given that there is already a field unused in activation/release, as discussed in Option B, introduction of a new flag is unjustified.

In order to realize option B, the following table is proposed in accordance with some embodiments:

|  | Activation DCI format 3_0/3_1 | Release DCI format 3_0/3_1 |
| --- | --- | --- |
| HARQ process number | set to '0000' (alternatively set to '1111' or '0001') | set to '1111' or '0001' (alternatively set to '0000') |

In case of release, additional fields such as time and frequency resources assignment can be set to default value in order to minimize positive FAR. In order to realize it, the following table is proposed in accordance with some embodiments:

|  | Activation DCI format 3_0/3_1 | Release DCI format 3_0/3_1 |
| --- | --- | --- |
| HARQ process number | set to '0000' (alternatively set to '1111' or '0001') | set to '1111' or '0001' (alternatively set to '0000') |
| Frequency offset |  | set to all '1' |
| Time offset |  | set to all '1' |
| Frequency resource indication |  | set to all '1' |
| Time resource indication |  | set to all '1' |

HARQ Process ID Determination for Configured Grants

In case of dynamic grant, HARQ ID and NDI were agreed to allow network to track UE buffer changes once it schedules initial transmission or retransmission. However, configured grant operation is usually based on traffic pattern characteristics rather the buffer status. Furthermore, usage of CG resources was agreed to be up to the UE, e.g., which resource to use for which TB. Taking this into account, there may be little or no benefit for a gNB to control HARQ process ID determination for configured grant cases. Instead, a configuration index can be used to refer to a semi-persistent process.

In cases where a ReTX of configured grant is scheduled, the HARQ ID field can be skipped/re-interpreted.

Timing Determination for Configured Grant Type 1 in Cross RAT Scheduling and Same RAT Scheduling Agreements:
• For dynamic grant and configured grant type-2, the slot of the first sidelink transmission is the in the first SL slot of the corresponding resource pool that starts not earlier than (working assumption for the formula) $T_{DL} - \frac{T_{TA}}{2} \times T_C + m \times T_{slot}$ where $T_{DL}$ is starting time of the slot carrying the corresponding DCI, $T_{TA}$ is the timing advance value and m is the slot offset (based on the SL numerology) between DCI and the first sidelink transmission scheduled by DCI, $T_c$ is as defined in 38.211, and $T_{slot}$ is the SL slot duration.
  ○ FFS the case of CG type 1
• FFS the application of the above formula to cross-RAT scheduling.

The proposed working assumption seems working well for all cases of different and same numerology on SL and DL carrier, thus it can be confirmed.

In case of configured grant type 1, which does not have associated DCI reception time, there are two alternatives in accordance with some embodiments as illustrated in FIG. 1, which illustrates an example of reference DL timing for the case of Type 1 configured sidelink scheduling:

Alt 1. The formula is not applied, and the configured slot offset with respect to DFN=0 is used. In this case there is a potential issue that gNB does not know usage of resources in a resource pool due to asynchronous timing. Therefore, dynamically scheduled transmissions or Type 2 CG transmissions may collide with Type 1 CG transmissions even scheduled by the same gNB.

Alt 2. $T_{DL}$ is the corresponding SFN=0 timing observed at a UE, and 'm' is calculated based on RRC-configured DFN offset. This option is suitable if the working assumption is confirmed.

Alt 3. the difference between SFN0 and DFN0 timings is to indicated by UE to network by request from gNB.
  UE can provide periodic update with preconfigured period on time difference between SFN and DFN. As an estimate of SFN timing UE can use DL RX timing−TA/2.
  UE can provide event-triggered update to gNB when difference between SFN and DFN timing changes on preconfigured or predefined value Δ.

Alt 2 may work under the assumption that the working assumption is held.

Systems and Implementations

Figure 2:
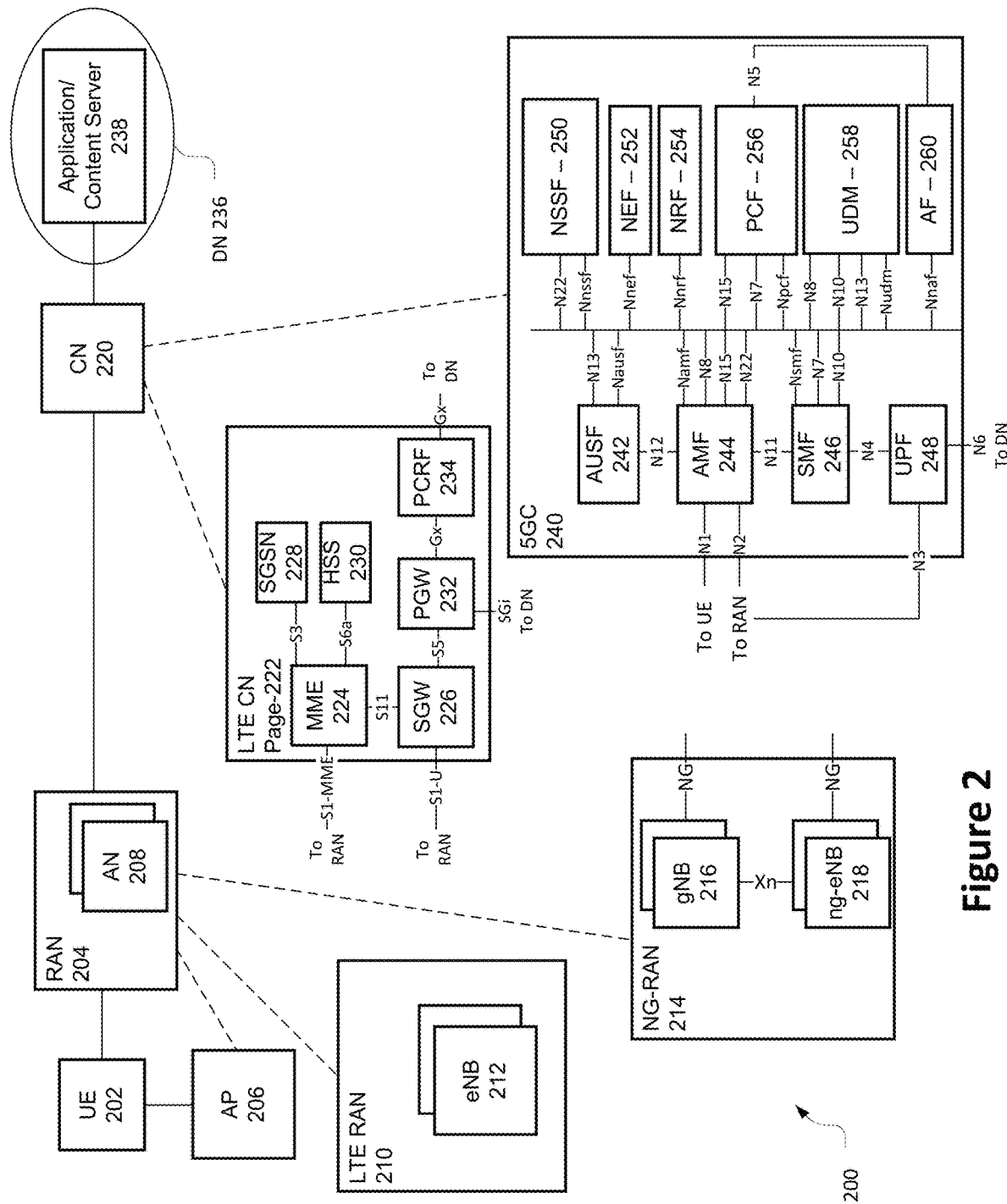
FIG. 2 illustrates an example of a network in accordance with various embodiments.
Figure 3:
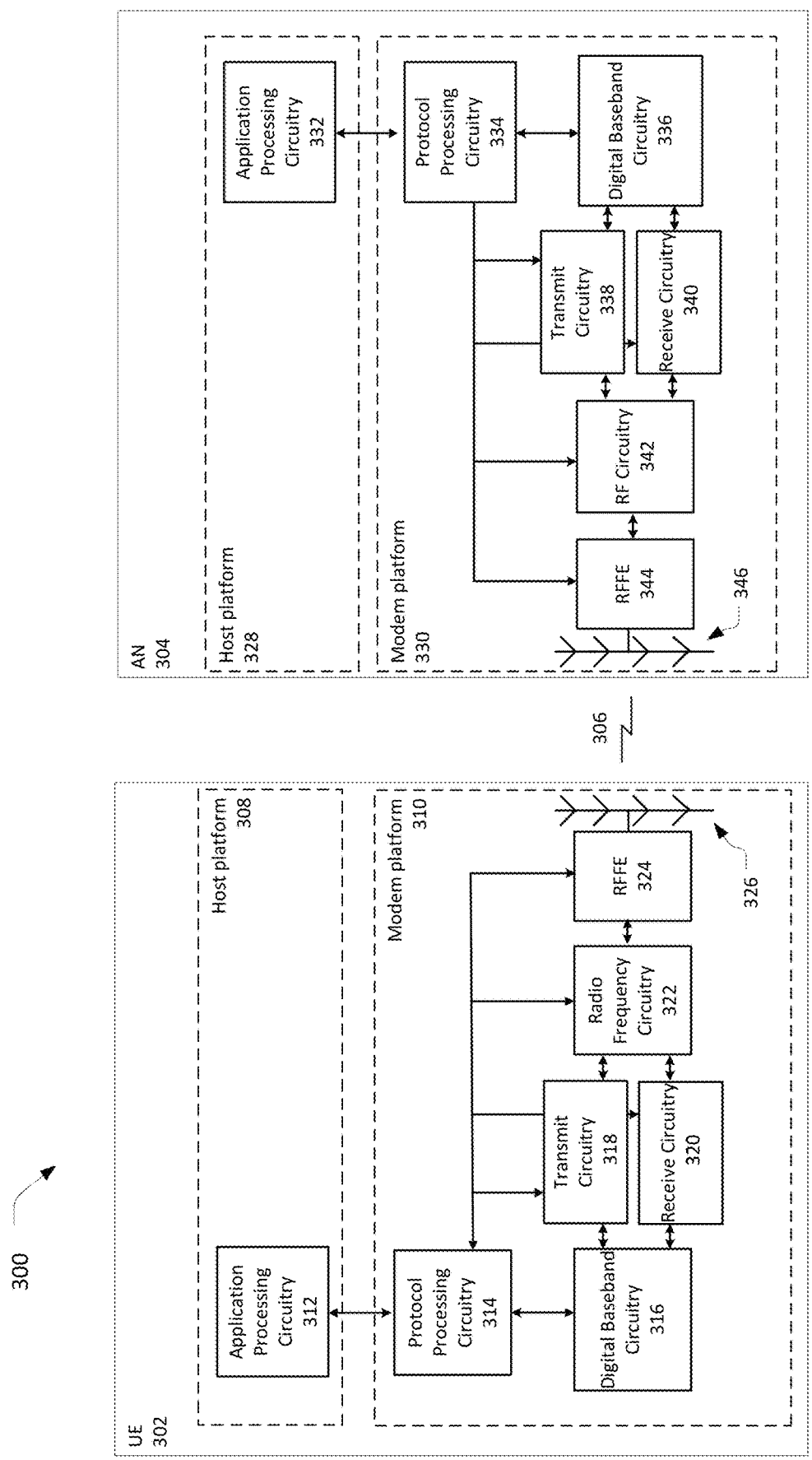
FIG. 3 schematically illustrates a wireless network in accordance with various embodiments.

FIGS. 2-3 illustrate various systems, devices, and components that may implement aspects of disclosed embodiments.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 200 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, AN 208. AN 208 may terminate air-interface protocols for the UE 202 by providing access stratum protocols including RRC, PDCP, RLC, MAC, and L1 protocols. In this manner, the AN 208 may enable data/voice connectivity between CN 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low power base station for providing femtocells, picocells or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 202 or AN 208 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface, but may connect with a UE via an LTE air interface. The gNB 216 and the ng-eNB 218 may connect with each other over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN 214 and an AMF 244 (e.g., N2 interface).

The NG-RAN 214 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amount of frequency resources (for example, PRBs) to support data transmission under different traffic loading scenarios. A BWP containing a smaller number of PRBs can be used for data transmission with small traffic load while allowing power saving at the UE 202 and in some cases at the gNB 216. A BWP containing a larger number of PRBs can be used for scenarios with higher traffic load.

The RAN 204 is communicatively coupled to CN 220 that includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be an LTE CN 222, which may also be referred to as an EPC. The LTE CN 222 may include MME 224, SGW 226, SGSN 228, HSS 230, PGW 232, and PCRF 234 coupled with one another over interfaces (or "reference points") as shown. Functions of the elements of the LTE CN 222 may be briefly introduced as follows.

The MME 224 may implement mobility management functions to track a current location of the UE 202 to facilitate paging, bearer activation/deactivation, handovers, gateway selection, authentication, etc.

The SGW 226 may terminate an S1 interface toward the RAN and route data packets between the RAN and the LTE CN 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track a location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 222 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for provision of IMS services. The PGW 232 may be coupled with a PCRF 234 via a Gx reference point.

The PCRF 234 is the policy and charging control element of the LTE CN 222. The PCRF 234 may be communicatively coupled to the app/content server 238 to determine appropriate QoS and charging parameters for service flows. The PCRF 232 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit an Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnect to data network 236, and a branching point to support multi-homed PDU session. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NS-SAIs, if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on exposed capabilities of other NFs. This information may be stored at the NEF 252 as structured data, or at a data storage NF using standardized interfaces. The stored information can then be re-exposed by the NEF 252 to other NFs and AFs, or used for other purposes such as analytics. Additionally, the NEF 252 may exhibit an Nnef service-based interface.

The NRF 254 may support service discovery functions, receive NF discovery requests from NF instances, and provide the information of the discovered NF instances to the NF instances. NRF 254 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 254 may exhibit the Nnrf service-based interface.

The PCF 256 may provide policy rules to control plane functions to enforce them, and may also support unified policy framework to govern network behavior. The PCF 256 may also implement a front end to access subscription information relevant for policy decisions in a UDR of the UDM 258. In addition to communicating with functions over reference points as shown, the PCF 256 exhibit an Npcf service-based interface.

The UDM 258 may handle subscription-related information to support the network entities' handling of communication sessions, and may store subscription data of UE 202. For example, subscription data may be communicated via an N8 reference point between the UDM 258 and the AMF 244. The UDM 258 may include two parts, an application front end and a UDR. The UDR may store subscription data and policy data for the UDM 258 and the PCF 256, and/or structured data for exposure and application data (including PFDs for application detection, application request information for multiple UEs 202) for the NEF 252. The Nudr service-based interface may be exhibited by the UDR 221 to allow the UDM 258, PCF 256, and NEF 252 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit an Naf service-based interface.

The data network 236 may represent various network operator services, Internet access, or third party services that may be provided by one or more servers including, for example, application/content server 238.

FIG. 3 schematically illustrates a wireless network 300 in accordance with various embodiments. The wireless network 300 may include a UE 302 in wireless communication with an AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling, and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more of layer operations to facilitate transmission or reception of data over the connection 306. The layer operations implemented by the protocol processing circuitry 314 may include, for example, MAC, RLC, PDCP, RRC and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 304 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 308 may perform various logical functions that include, for example, RNC functions such as radio bearer management, uplink and downlink dynamic radio resource management, and data packet scheduling.

Figure 4:
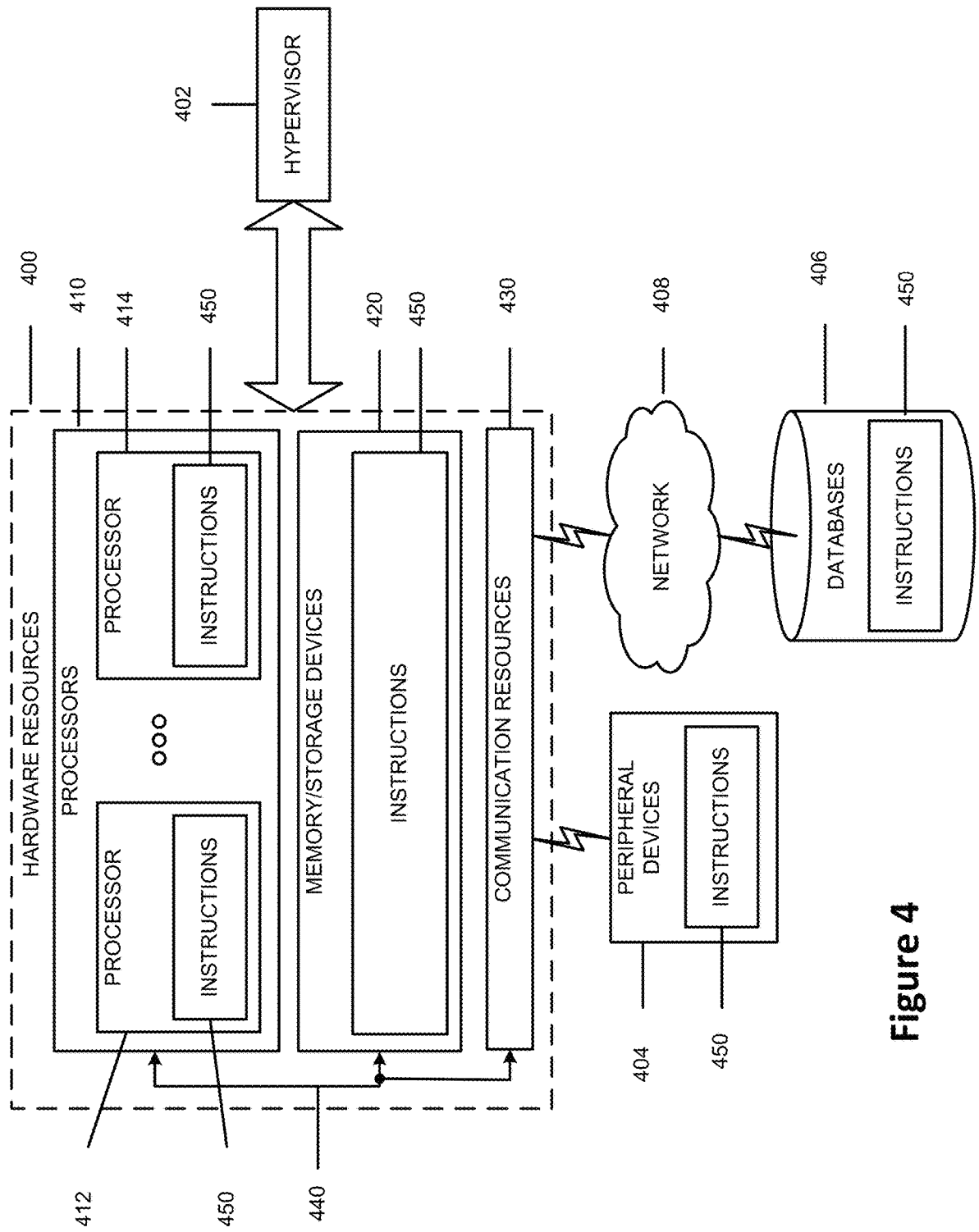
FIG. 4 is a block diagram illustrating components, according to some example embodiments, able to read instructions from a machine-readable or computer-readable medium (e.g., a non-transitory machine-readable storage medium) and perform any one or more of the methodologies discussed herein.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include main memory, disk storage, or any suitable combination thereof. The memory/storage devices 420 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

Example Procedures

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

In various embodiments, the devices/components of FIGS. 2-4, and particularly the baseband circuitry of FIG. 3, may be used to practice, in whole or in part, any of the operation flow/algorithmic structures depicted in FIGS. 5A, 5B, and 5C.

One example of an operation flow/algorithmic structure is depicted in FIG. 5A. In this example, operation flow/algorithmic structure 500 may include, at 505, retrieving, from memory, downlink control information (DCI) associated with a configured grant sidelink transmission by a user equipment (UE), wherein the DCI includes an indication of an activation or release of a sidelink resource. Operation flow/algorithmic structure 500 may further include, at 510, encoding a message for transmission to the UE that includes the DCI scrambled by a sidelink-configured scheduling-radio network temporary identifier (SL-CS-RNTI).

Another example of an operation flow/algorithmic structure is depicted in FIG. 5B. In this example, operation flow/algorithmic structure 520 may include, at 525, determining downlink control information (DCI) associated with a configured grant sidelink transmission by a user equipment (UE), wherein the DCI includes an indication of an activation or release of a sidelink resource. Operation flow/algorithmic structure 520 may further include, at 530, encoding a message for transmission to the UE that includes the DCI scrambled by a sidelink-configured scheduling-radio network temporary identifier (SL-CS-RNTI).

Another example of an operation flow/algorithmic structure is depicted in FIG. 5C. In this example, operation flow/algorithmic structure 540 may include, at 545, receiving a message that includes downlink control information (DCI) associated with a configured grant sidelink transmission, wherein the DCI is scrambled by a sidelink-configured scheduling-radio network temporary identifier (SL-CS-RNTI), and wherein the DCI includes an indication of an activation or release of a sidelink resource. Operation flow/algorithmic structure 540 may further include, at 550, encoding a physical sidelink shared channel (PSSCH) or physical sidelink control channel (PSCCH) message for transmission based on the DCI.

EXAMPLES

Example 1 may include a method of gNB-scheduled sidelink resource allocation with configured grant, the method comprising:
  receiving, by a user equipment (UE) a radio resource control (RRC) configuration for configured grant sidelink transmission;
  receiving, by the UE, downlink control information (DCI) scrambled by SL-CS-RNTI;
  identifying by the UE, whether the DCI is for activation or release or dynamic retransmission;
  applying, by the UE, a timing rule; and
  transmitting by the UE, a PSSCH/PSCCH according to a provided schedule.

Example 2 may include the method of example 1 or some other example herein, wherein activation/release scrambled with SL-CS-RNTI and dynamic grant scrambled with SL-CS-RNTI can be distinguished by value of NDI. In this case, NDI=0 is treated as activation/release and NDI=1 is treated as ReTX grant.

Example 3 may include the method of example 1 or some other example herein, wherein in order to distinguish activation and release an invalid state of one of the fields may be used.

Example 4 may include the method of example 1 or some other example herein, wherein in order to distinguish activation and release different state of a field unused in case of SL-CS-RNTI. Such a field can be HARQ ID, if it is unused in case of dynamic retransmission scheduling.

Example 5 may include the method of example 1 or some other example herein, wherein in order to distinguish activation and release a new 1-bit flag to distinguish activation and release is introduced in DCI.

Example 6 may include the method of the example 4 or some other example herein, wherein in case of activation by DCI format 3_0/3_1 the HARQ process number is set to all '0' and in case of release by DCI format 3_0/3_1 the HARQ process number is set to all '1'.

Example 7 may include the method of example 4 or some other example herein, wherein in case of activation by DCI format 3_0/3_1 the HARQ process number is set to all '1' and in case of release by DCI format 3_0/3_1 the HARQ process number is set to all '0'.

Example 8 may include the method of example 4 or some other example herein, wherein in case of activation by DCI format 3_0/3_1 the HARQ process number is set to '0001' and in case of release by DCI format 3_0/3_1 the HARQ process number is set to '0000.'

Example 9 may include the method of example 1 or some other example herein, wherein in case of release, one or multiple of the following DCI bitfields: Frequency offset, Time offset, Frequency resource indication, Time resource indication, are set to all '1'.

Example 10 may include the method of example 1 or some other example herein, wherein in case of release, one or multiple of the following DCI bitfields: Frequency offset, Time offset, Frequency resource indication, Time resource indication, are set to all '0'.

Example 11 may include the method of example 1 or some other example herein, wherein HARQ process ID is up to UE in case of Type 1 or Type 2 configured grant scheduling.

Example 12 may include the method of example 11 or some other example herein, wherein configuration index in DCI is used to address retransmission grant.

Example 13 may include the method of example 1 or some other example herein, wherein for Type 1 configured grant the timing calculation formula is not applied, and the configured slot offset with respect to DFN=0 is used.

Example 14 may include the method of example 1 or some other example herein, wherein for Type 1 configured grant in the timing calculation formula $T_{DL}$ is the corresponding SFN=0 timing observed at a UE, and 'm' is calculated based on RRC-configured DFN offset.

Example 15 may include the method of example 1 or some other example herein, wherein for Type 1 configured grant the difference between SFN0 and DFN0 timings is to indicated by UE to network by request from gNB
  UE can provide periodic update with preconfigured period on time difference between SFN and DFN. As an estimate of SFN timing UE can use DL RX timing–TA/2
  UE can provide event-triggered update to gNB when difference between SFN and DFN timing changes on preconfigured or predefined value Δ.

Example X1 includes an apparatus comprising: memory to store downlink control information (DCI) associated with a configured grant sidelink transmission by a user equipment (UE), wherein the DCI includes an indication of an activation or release of a sidelink resource; and processor circuitry, coupled with the memory, to: retrieve the DCI from the memory; and encode a message for transmission to the UE that includes the DCI scrambled by a sidelink-configured scheduling-radio network temporary identifier (SL-CS-RNTI).

Example X2 includes the apparatus of example X1 or some other example herein, wherein the DCI indicates the activation or release of the sidelink resource using a one-bit flag.

Example X3 includes the apparatus of example X1 or some other example herein, wherein the DCI indicates the activation or release of the sidelink resource using a hybrid automatic repeat request (HARQ) process number identifier field.

Example X4 includes the apparatus of example X3 or some other example herein, wherein the DCI is DCI format 30 or 31, and wherein the DCI is to indicate an activation of a sidelink resource and the HARQ process number identifier is set to all 0's or the DCI is to indicate a release and the HARQ process number identifier is set to all 1's.

Example X5 includes the apparatus of example X3 or some other example herein, wherein the DCI is DCI format 30 or 31, and wherein the DCI is to indicate an activation of a sidelink resource and the HARQ process number identifier is set to all 1's or the DCI is to indicate a release and the HARQ process number identifier is set to all 0's.

Example X6 includes the apparatus of example X3 or some other example herein, wherein the DCI is DCI format 30 or 31, and wherein the DCI is to indicate an activation of a sidelink resource and the HARQ process number identifier is set to '0001' or the DCI is to indicate a release and the HARQ process number identifier is set to '0000.'

Example X7 includes the apparatus of example X1 or some other example herein, wherein the DCI is to indicate a release of a sidelink resource and includes a frequency offset bitfield set to all 1's.

Example X8 includes one or more non-transitory computer-readable media storing instructions that, when executed by one or more processors, are to cause a device to: determine downlink control information (DCI) associated with a configured grant sidelink transmission by a user equipment (UE), wherein the DCI includes an indication of an activation or release of a sidelink resource; and encode a message for transmission to the UE that includes the DCI scrambled by a sidelink-configured scheduling-radio network temporary identifier (SL-CS-RNTI).

Example X9 includes the one or more non-transitory computer-readable media of example X8 or some other example herein, wherein the DCI indicates the activation or release of the sidelink resource using a one-bit flag.

Example X10 includes the one or more non-transitory computer-readable media of example X8 or some other example herein, wherein the DCI indicates the activation or release of the sidelink resource using a hybrid automatic repeat request (HARQ) process number identifier field.

Example X11 includes the one or more non-transitory computer-readable media of example X10 or some other example herein, wherein the DCI is DCI format 3_0 or 3_1, and wherein the DCI is to indicate an activation of a sidelink resource and the HARQ process number identifier is set to all 0's or the DCI is to indicate a release and the HARQ process number identifier is set to all 1's.

Example X12 includes the one or more non-transitory computer-readable media of example X10 or some other example herein, wherein the DCI is DCI format 3_0 or 3_1, and wherein the DCI is to indicate an activation of a sidelink resource and the HARQ process number identifier is set to all 1's or the DCI is to indicate a release and the HARQ process number identifier is set to all 0's.

Example X13 includes the one or more non-transitory computer-readable media of example X10 or some other example herein, wherein the DCI is DCI format 3_0 or 3_1, and wherein the DCI is to indicate an activation of a sidelink resource and the HARQ process number identifier is set to '0001' or the DCI is to indicate a release and the HARQ process number identifier is set to '0000.'

Example X14 includes the one or more non-transitory computer-readable media of example X8 or some other example herein, wherein the DCI is to indicate a release of a sidelink resource and includes a frequency offset bitfield set to all 1's.

Example X15 includes one or more non-transitory computer-readable media storing instructions that, when executed by one or more processors, are to cause a user equipment (UE) to: receive a message that includes downlink control information (DCI) associated with a configured grant sidelink transmission, wherein the DCI is scrambled by a sidelink-configured scheduling-radio network temporary identifier (SL-CS-RNTI), and wherein the DCI includes an indication of an activation or release of a sidelink resource; and encode a physical sidelink shared channel (PSSCH) or physical sidelink control channel (PSCCH) message for transmission based on the DCI.

Example X16 includes the one or more non-transitory computer-readable media of example X15 or some other example herein, wherein the DCI indicates the activation or release of the sidelink resource using a one-bit flag.

Example X17 includes the one or more non-transitory computer-readable media of example X15 or some other example herein, wherein the DCI indicates the release of the sidelink resource using a hybrid automatic repeat request (HARQ) process number identifier field, and the DCI includes a frequency offset bitfield set to all 1's.

Example X18 includes the one or more non-transitory computer-readable media of example X17 or some other example herein, wherein the DCI is DCI format 3_0 or 3_1, and wherein the DCI is to indicate an activation of a sidelink resource and the HARQ process number identifier is set to all 0's or the DCI is to indicate a release and the HARQ process number identifier is set to all 1's.

Example X19 includes the one or more non-transitory computer-readable media of example X17 or some other example herein, wherein the DCI is DCI format 3_0 or 3_1, and wherein the DCI is to indicate an activation of a sidelink resource and the HARQ process number identifier is set to all 1's or the DCI is to indicate a release and the HARQ process number identifier is set to all 0's.

Example X20 includes the one or more non-transitory computer-readable media of example X17 or some other example herein, wherein the DCI is DCI format 3_0 or 3_1, and wherein the DCI is to indicate an activation of a sidelink resource and the HARQ process number identifier is set to '0001' or the DCI is to indicate a release and the HARQ process number identifier is set to '0000.'

Example Z01 may include an apparatus comprising means to perform one or more elements of a method described in or related to any of examples 1-X20, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X20, or any other method or process described herein.

Example Z03 may include an apparatus comprising logic, modules, or circuitry to perform one or more elements of a method described in or related to any of examples 1-X20, or any other method or process described herein.

Example Z04 may include a method, technique, or process as described in or related to any of examples 1-X20, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X20, or portions thereof.

Example Z06 may include a signal as described in or related to any of examples 1-X20, or portions or parts thereof.

Example Z07 may include a datagram, packet, frame, segment, protocol data unit (PDU), or message as described in or related to any of examples 1-X20, or portions or parts thereof, or otherwise described in the present disclosure.

Example Z08 may include a signal encoded with data as described in or related to any of examples 1-X20, or portions or parts thereof, or otherwise described in the present disclosure.

Example Z09 may include a signal encoded with a datagram, packet, frame, segment, protocol data unit (PDU), or message as described in or related to any of examples 1-X20, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X20, or portions thereof.

Example Z11 may include a computer program comprising instructions, wherein execution of the program by a processing element is to cause the processing element to carry out the method, techniques, or process as described in or related to any of examples 1-X20, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| ACK | Acknowledgement |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |

| | | |
|---|---|---|
| CPE | Customer Premise Equipment | |
| CPICH | Common Pilot Channel | |
| CQI | Channel Quality Indicator | |
| CPU | CSI processing unit, Central Processing Unit | |
| C/R | Command/Response field bit | |
| CRAN | Cloud Radio Access Network, Cloud RAN | |
| CRB | Common Resource Block | |
| CRC | Cyclic Redundancy Check | |
| CRI | Channel-State Information Resource Indicator, CSI-RS Resource Indicator | |
| C-RNTI | Cell RNTI | |
| CS | Circuit Switched | |
| CSAR | Cloud Service Archive | |
| CSI | Channel-State Information | |
| CSI-IM | CSI Interference Measurement | |
| CSI-RS | CSI Reference Signal | |
| CSI-RSRP | CSI reference signal received power | |
| CSI-RSRQ | CSI reference signal received quality | |
| CSI-SINR | CSI signal-to-noise and interference ratio | |
| CSMA | Carrier Sense Multiple Access | |
| CSMA/CA | CSMA with collision avoidance | |
| CSS | Common Search Space, Cell-specific Search Space | |
| CTS | Clear-to-Send | |
| CW | Codeword | |
| CWS | Contention Window Size | |
| D2D | Device-to-Device | |
| DC | Dual Connectivity, Direct Current | |
| DCI | Downlink Control Information | |
| DF | Deployment Flavour | |
| DL | Downlink | |
| DMTF | Distributed Management Task Force | |
| DPDK | Data Plane Development Kit | |
| DM-RS, DMRS | Demodulation Reference Signal | |
| DN | Data network | |
| DRB | Data Radio Bearer | |
| DRS | Discovery Reference Signal | |
| DRX | Discontinuous Reception | |
| DSL | Domain Specific Language. Digital Subscriber Line | |
| DSLAM | DSL Access Multiplexer | |
| DwPTS | Downlink Pilot Time Slot | |
| E-LAN | Ethernet Local Area Network | |
| E2E | End-to-End | |
| ECCA | extended clear channel assessment, extended CCA | |
| ECCE | Enhanced Control Channel Element, Enhanced CCE | |
| ED | Energy Detection | |
| EDGE | Enhanced Datarates for GSM Evolution (GSM Evolution) | |
| EGMF | Exposure Governance Management Function | |
| EGPRS | Enhanced GPRS | |
| EIR | Equipment Identity Register | |
| eLAA | enhanced Licensed Assisted Access, enhanced LAA | |
| EM | Element Manager | |
| eMBB | Enhanced Mobile Broadband | |
| EMS | Element Management System | |
| eNB | evolved NodeB, E-UTRAN Node B | |
| EN-DC | E-UTRA-NR Dual Connectivity | |
| EPC | Evolved Packet Core | |
| EPDCCH | enhanced PDCCH, enhanced Physical Downlink Control Cannel | |
| EPRE | Energy per resource element | |
| EPS | Evolved Packet System | |
| EREG | enhanced REG, enhanced resource element groups | |
| ETSI | European Telecommunications Standards Institute | |
| ETWS | Earthquake and Tsunami Warning System | |
| eUICC | embedded UICC, embedded Universal Integrated Circuit Card | |
| E-UTRA | Evolved UTRA | |
| E-UTRAN | Evolved UTRAN | |
| EV2X | Enhanced V2X | |
| F1AP | F1 Application Protocol | |
| F1-C | F1 Control plane interface | |
| F1-U | F1 User plane interface | |
| FACCH | Fast Associated Control CHannel | |
| FACCH/F | Fast Associated Control Channel/Full rate | |
| FACCH/H | Fast Associated Control Channel/Half rate | |
| FACH | Forward Access Channel | |

-continued

| | | |
|---|---|---|
| FAUSCH | Fast Uplink Signalling Channel | |
| FB | Functional Block | |
| FBI | Feedback Information | |
| FCC | Federal Communications Commission | |
| FCCH | Frequency Correction CHannel | |
| FDD | Frequency Division Duplex | |
| FDM | Frequency Division Multiplex | |
| FDMA | Frequency Division Multiple Access | |
| FE | Front End | |
| FEC | Forward Error Correction | |
| FFS | For Further Study | |
| FFT | Fast Fourier Transformation | |
| feLAA | further enhanced Licensed Assisted Access, further enhanced LAA | |
| FN | Frame Number | |
| FPGA | Field-Programmable Gate Array | |
| FR | Frequency Range | |
| G-RNTI | GERAN Radio Network Temporary Identity | |
| GERAN | GSM EDGE RAN, GSM EDGE Radio Access Network | |
| GGSN | Gateway GPRS Support Node | |
| GLONASS | GLObal'naya NAvigatsionnaya Sputnikovaya Sistema (Engl.: Global Navigation Satellite System) | |
| gNB | Next Generation NodeB | |
| gNB-CU | gNB-centralized unit, Next Generation NodeB centralized unit | |
| gNB-DU | gNB-distributed unit, Next Generation NodeB distributed unit | |
| GNSS | Global Navigation Satellite System | |
| GPRS | General Packet Radio Service | |
| GSM | Global System for Mobile Communications, Groupe Spécial Mobile | |
| GTP | GPRS Tunneling Protocol | |
| GTP-UGPRS | Tunnelling Protocol for User Plane | |
| GTS | Go To Sleep Signal (related to WUS) | |
| GUMMEI | Globally Unique MME Identifier | |
| GUTI | Globally Unique Temporary UE Identity | |
| HARQ | Hybrid ARQ, Hybrid Automatic Repeat Request | |
| HANDO | Handover | |
| HFN | HyperFrame Number | |
| HHO | Hard Handover | |
| HLR | Home Location Register | |
| HN | Home Network | |
| HO | Handover | |
| HPLMN | Home Public Land Mobile Network | |
| HSDPA | High Speed Downlink Packet Access | |
| HSN | Hopping Sequence Number | |
| HSPA | High Speed Packet Access | |
| HSS | Home Subscriber Server | |
| HSUPA | High Speed Uplink Packet Access | |
| HTTP | Hyper Text Transfer Protocol | |
| HTTPS | Hyper Text Transfer Protocol Secure (https is http/1.1 over SSL, i.e. port 443) | |
| IB | I-Block Information Block | |
| ICCID | Integrated Circuit Card Identification | |
| IAB | Integrated Access and Backhaul | |
| ICIC | Inter-Cell Interference Coordination | |
| ID | Identity, identifier | |
| IDFT | Inverse Discrete Fourier Transform | |
| IE | Information element | |
| IBE | In-Band Emission | |
| IEEE | Institute of Electrical and Electronics Engineers | |
| IEI | Information Element Identifier | |
| IEIDL | Information Element Identifier Data Length | |
| IETF | Internet Engineering Task Force | |
| IF | Infrastructure | |
| IM | Interference Measurement, Intermodulation, IP Multimedia | |
| IMC | IMS Credentials | |
| IMEI | International Mobile Equipment Identity | |
| IMGI | International mobile group identity | |
| IMPI | IP Multimedia Private Identity | |
| IMPU | IP Multimedia PUblic identity | |
| IMS | IP Multimedia Subsystem | |
| IMSI | International Mobile Subscriber Identity | |
| IoT | Internet of Things | |
| IP | Internet Protocol | |
| Ipsec | IP Security, Internet Protocol Security | |

| | | |
|---|---|---|
| IP-CAN | IP-Connectivity Access Network | |
| IP-M | IP Multicast | |
| IPv4 | Internet Protocol Version 4 | |
| IPv6 | Internet Protocol Version 6 | |
| IR | Infrared | |
| IS | In Sync | |
| IRP | Integration Reference Point | |
| ISDN | Integrated Services Digital Network | |
| ISIM | IM Services Identity Module | |
| ISO | International Organisation for Standardisation | |
| ISP | Internet Service Provider | |
| IWF | Interworking-Function | |
| I-WLAN | Interworking WLAN Constraint length of the convolutional code, USIM Individual key | |
| kB | Kilobyte (1000 bytes) | |
| kbps | kilo-bits per second | |
| Kc | Ciphering key | |
| Ki | Individual subscriber authentication key | |
| KPI | Key Performance Indicator | |
| KQI | Key Quality Indicator | |
| KSI | Key Set Identifier | |
| ksps | kilo-symbols per second | |
| KVM | Kernel Virtual Machine | |
| L1 | Layer 1 (physical layer) | |
| L1-RSRP | Layer 1 reference signal received power | |
| L2 | Layer 2 (data link layer) | |
| L3 | Layer 3 (network layer) | |
| LAA | Licensed Assisted Access | |
| LAN | Local Area Network | |
| LBT | Listen Before Talk | |
| LCM | LifeCycle Management | |
| LCR | Low Chip Rate | |
| LCS | Location Services | |
| LCID | Logical Channel ID | |
| LI | Layer Indicator | |
| LLC | Logical Link Control, Low Layer Compatibility | |
| LPLMN | Local PLMN | |
| LPP | LTE Positioning Protocol | |
| LSB | Least Significant Bit | |
| LTE | Long Term Evolution | |
| LWA | LTE-WLAN aggregation | |
| LWIP | LTE/WLAN Radio Level Integration with IPsec Tunnel | |
| LTE | Long Term Evolution | |
| M2M | Machine-to-Machine | |
| MAC | Medium Access Control (protocol layering context) | |
| MAC | Message authentication code (security/encryption context) | |
| MAC-A | MAC used for authentication and key agreement (TSG T WG3 context) | |
| MAC-IMAC | used for data integrity of signalling messages (TSG T WG3 context) | |
| MANO | Management and Orchestration | |
| MBMS | Multimedia Broadcast and Multicast Service | |
| MBSFN | Multimedia Broadcast multicast service Single Frequency Network | |
| MCC | Mobile Country Code | |
| MCG | Master Cell Group | |
| MCOT | Maximum Channel Occupancy Time | |
| MCS | Modulation and coding scheme | |
| MDAF | Management Data Analytics Function | |
| MDAS | Management Data Analytics Service | |
| MDT | Minimization of Drive Tests | |
| ME | Mobile Equipment | |
| MeNB | master eNB | |
| MER | Message Error Ratio | |
| MGL | Measurement Gap Length | |
| MGRP | Measurement Gap Repetition Period | |
| MIB | Master Information Block, Management Information Base | |
| MIMO | Multiple Input Multiple Output | |
| MLC | Mobile Location Centre | |
| MM | Mobility Management | |
| MME | Mobility Management Entity | |
| MN | Master Node | |
| MnS | Management Service | |
| MO | Measurement Object, Mobile Originated | |
| MPBCH | MTC Physical Broadcast CHannel | |
| MPDCCH | MTC Physical Downlink Control CHannel | |
| MPDSCH | MTC Physical Downlink Shared CHannel | |

| | | | |
|---|---|---|---|
| MPRACH | MTC Physical Random Access CHannel | NMIB, N-MIB | Narrowband MIB |
| MPUSCH | MTC Physical Uplink Shared Channel | NPBCH | Narrowband Physical Broadcast CHannel |
| MPLS | MultiProtocol Label Switching | NPDCCH | Narrowband Physical Downlink Control CHannel |
| MS | Mobile Station | NPDSCH | Narrowband Physical Downlink Shared CHannel |
| MSB | Most Significant Bit | NPRACH | Narrowband Physical Random Access CHannel |
| MSC | Mobile Switching Centre | NPUSCH | Narrowband Physical Uplink Shared CHannel |
| MSI | Minimum System Information, MCH Scheduling Information | NPSS | Narrowband Primary Synchronization Signal |
| MSID | Mobile Station Identifier | NSSS | Narrowband Secondary Synchronization Signal |
| MSIN | Mobile Station Identification Number | NR | New Radio, Neighbour Relation |
| MSISDN | Mobile Subscriber ISDN Number | NRF | NF Repository Function |
| MT | Mobile Terminated, Mobile Termination | NRS | Narrowband Reference Signal |
| MTC | Machine-Type Communications | NS | Network Service |
| mMTC | massive MTC, massive Machine-Type Communications | NSA | Non-Standalone operation mode |
| MU-MIMO | Multi User MIMO | NSD | Network Service Descriptor |
| MWUS | MTC wake-up signal, MTC WUS | NSR | Network Service Record |
| NACK | Negative Acknowledgement | NSSAI | Network Slice Selection Assistance Information |
| NAI | Network Access Identifier | S-NNSAI | Single-NSSAI |
| NAS | Non-Access Stratum, Non-Access Stratum layer | NSSF | Network Slice Selection Function |
| | | NW | Network |
| NCT | Network Connectivity Topology | NWUS | Narrowband wake-up signal, Narrowband WUS |
| NC-JT | Non-Coherent Joint Transmission | NZP | Non-Zero Power |
| | | O&M | Operation and Maintenance |
| NEC | Network Capability Exposure | ODU2 | Optical channel Data Unit-type 2 |
| NE-DC | NR-E-UTRA Dual Connectivity | OFDM | Orthogonal Frequency Division Multiplexing |
| NEF | Network Exposure Function | OFDMA | Orthogonal Frequency Division Multiple Access |
| NF | Network Function | OOB | Out-of-band |
| NFP | Network Forwarding Path | OOS | Out of Sync |
| | | OPEX | OPerating EXpense |
| NFPD | Network Forwarding Path Descriptor | OSI | Other System Information |
| NFV | Network Functions Virtualization | OSS | Operations Support System |
| NFVI | NFV Infrastructure | OTA | over-the-air |
| NFVO | NFV Orchestrator | PAPR | Peak-to-Average Power Ratio |
| NG | Next Generation, Next Gen | PAR | Peak to Average Ratio |
| NGEN-DC | NG-RAN E-UTRA-NR Dual Connectivity | PBCH | Physical Broadcast Channel |
| | | PC | Power Control, Personal Computer |
| NM | Network Manager | | |
| NMS | Network Management System | PCC | Primary Component Carrier, Primary CC |
| N-PoP | Network Point of Presence | PCell | Primary Cell |

| | | | | |
|---|---|---|---|---|
| PCI | Physical Cell ID, Physical Cell Identity | | PSCCH | Physical Sidelink Control Channel |
| PCEF | Policy and Charging Enforcement Function | | PSFCH | Physical Sidelink Feedback Channel |
| PCF | Policy Control Function | | PSSCH | Physical Sidelink Shared Channel |
| PCRF | Policy Control and Charging Rules Function | | PSCell | Primary SCell |
| | | | PSS | Primary Synchronization Signal |
| PDCP | Packet Data Convergence Protocol, Packet Data Convergence Protocol layer | | PSTN | Public Switched Telephone Network |
| | | | PT-RS | Phase-tracking reference signal |
| PDCCH | Physical Downlink Control Channel | | PTT | Push-to-Talk |
| | | | PUCCH | Physical Uplink Control Channel |
| PDCP | Packet Data Convergence Protocol | | PUSCH | Physical Uplink Shared Channel |
| PDN | Packet Data Network, Public Data Network | | QAM | Quadrature Amplitude Modulation |
| PDSCH | Physical Downlink Shared Channel | | QCI | QoS class of identifier |
| PDU | Protocol Data Unit | | QCL | Quasi co-location |
| PEI | Permanent Equipment Identifiers | | QFI | QoS Flow ID, QoS Flow Identifier |
| PFD | Packet Flow Description | | QoS | Quality of Service |
| P-GW | PDN Gateway | | QPSK | Quadrature (Quaternary) Phase Shift Keying |
| PHICH | Physical hybrid-ARQ indicator channel | | QZSS | Quasi-Zenith Satellite System |
| PHY | Physical layer | | RA-RNTI | Random Access RNTI |
| PLMN | Public Land Mobile Network | | RAB | Radio Access Bearer, Random Access Burst |
| PIN | Personal Identification Number | | RACH | Random Access Channel |
| PM | Performance Measurement | | RADIUS | Remote Authentication Dial In User Service |
| PMI | Precoding Matrix Indicator | | RAN | Radio Access Network |
| PNF | Physical Network Function | | RAND | RANDom number (used for authentication) |
| PNFD | Physical Network Function Descriptor | | RAR | Random Access Response |
| PNFR | Physical Network Function Record | | RAT | Radio Access Technology |
| POC | PTT over Cellular | | RAU | Routing Area Update |
| PP, PTP | Point-to-Point | | RB | Resource block, Radio Bearer |
| PPP | Point-to-Point Protocol | | RBG | Resource block group |
| PRACH | Physical RACH | | REG | Resource Element Group |
| PRB | Physical resource block | | Rel | Release |
| PRG | Physical resource block group | | REQ | REQuest |
| ProSe | Proximity Services, Proximity-Based Service | | RF | Radio Frequency |
| | | | RI | Rank Indicator |
| PRS | Positioning Reference Signal | | RIV | Resource indicator value |
| PRR | Packet Reception Radio | | RL | Radio Link |
| | | | RLC | Radio Link Control, Radio Link Control layer |
| PS | Packet Services | | | |
| PSBCH | Physical Sidelink Broadcast Channel | | RLC AM | RLC Acknowledged Mode |
| PSDCH | Physical Sidelink Downlink Channel | | RLC UM | RLC Unacknowledged Mode |
| | | | RLF | Radio Link Failure |

| | | |
|---|---|---|
| RLM | Radio Link Monitoring | |
| RLM-RS | Reference Signal for RLM | |
| RM | Registration Management | |
| RMC | Reference Measurement Channel | |
| RMSI | Remaining MSI, Remaining Minimum System Information | |
| RN | Relay Node | |
| RNC | Radio Network Controller | |
| RNL | Radio Network Layer | |
| RNTI | Radio Network Temporary Identifier | |
| ROHC | RObust Header Compression | |
| RRC | Radio Resource Control, Radio Resource Control layer | |
| RRM | Radio Resource Management | |
| RS | Reference Signal | |
| RSRP | Reference Signal Received Power | |
| RSRQ | Reference Signal Received Quality | |
| RSSI | Received Signal Strength Indicator | |
| RSU | Road Side Unit | |
| RSTD | Reference Signal Time difference | |
| RTP | Real Time Protocol | |
| RTS | Ready-To-Send | |
| RTT | Round Trip Time | |
| Rx | Reception, Receiving, Receiver | |
| S1AP | S1 Application Protocol | |
| S1-MME | S1 for the control plane | |
| S1-U | S1 for the user plane | |
| S-GW | Serving Gateway | |
| S-RNTI | SRNC Radio Network Temporary Identity | |
| S-TMSI | SAE Temporary Mobile Station Identifier | |
| SA | Standalone operation mode | |
| SAE | System Architecture Evolution | |
| SAP | Service Access Point | |
| SAPD | Service Access Point Descriptor | |
| SAPI | Service Access Point Identifier | |
| SCC | Secondary Component Carrier, Secondary CC | |
| SCell | Secondary Cell | |
| SC-FDMA | Single Carrier Frequency Division Multiple Access | |
| SCG | Secondary Cell Group | |
| SCM | Security Context Management | |
| SCS | Subcarrier Spacing | |
| SCTP | Stream Control Transmission Protocol | |
| SDAP | Service Data Adaptation Protocol, Service Data Adaptation Protocol layer | |
| SDL | Supplementary Downlink | |
| SDNF | Structured Data Storage Network Function | |
| SDP | Session Description Protocol | |
| SDSF | Structured Data Storage Function | |
| SDU | Service Data Unit | |
| SEAF | Security Anchor Function | |
| SeNB | secondary eNB | |
| SEPP | Security Edge Protection Proxy | |
| SFI | Slot format indication | |
| SFTD | Space-Frequency Time Diversity, SFN and frame timing difference | |
| SFN | System Frame Number or Single Frequency Network | |
| SgNB | Secondary gNB | |
| SGSN | Serving GPRS Support Node | |
| S-GW | Serving Gateway | |
| SI | System Information | |
| SI-RNTI | System Information RNTI | |
| SIB | System Information Block | |
| SIM | Subscriber Identity Module | |
| SIP | Session Initiated Protocol | |
| SiP | System in Package | |
| SL | Sidelink | |
| SLA | Service Level Agreement | |
| SM | Session Management | |
| SMF | Session Management Function | |
| SMS | Short Message Service | |
| SMSF | SMS Function | |
| SMTC | SSB-based Measurement Timing Configuration | |
| SN | Secondary Node, Sequence Number | |
| SoC | System on Chip | |
| SON | Self-Organizing Network | |
| SpCell | Special Cell | |
| SP-CSI-RNTI | Semi-Persistent CSI RNTI | |
| SPS | Semi-Persistent Scheduling | |
| SQN | Sequence number | |
| SR | Scheduling Request | |
| SRB | Signalling Radio Bearer | |
| SRS | Sounding Reference Signal | |
| SS | Synchronization Signal | |
| SSB | SS Block | |
| SSBRI | SSB Resource Indicator | |
| SSC | Session and Service Continuity | |

-continued

| | |
|---|---|
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDR | Unified Data Repository |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |

| | |
|---|---|
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA.

The term "Special Cell" refers to the PCell of the MCG or the PSCell of the SCG for DC operation; otherwise, the term "Special Cell" refers to the Pcell.

What is claimed is:

1. One or more non-transitory computer-readable media storing instructions that, when executed by one or more processors, are to cause a next-generation NodeB (gNB) to:
    determine downlink control information (DCI) associated with a configured grant sidelink transmission by a user equipment (UE), wherein the DCI includes an indication of an activation or a release of a sidelink resource using a hybrid automatic repeat request (HARQ) process number identifier field, wherein the DCI is DCI format 3_0 or 3_1, and wherein the DCI is to indicate the activation of the sidelink resource and the HARQ process number identifier field is set to all 0's or the DCI is to indicate the release and the HARQ process number identifier field is set to all 1's; and
    encode a message for transmission to the UE that includes the DCI scrambled by a sidelink-configured scheduling-radio network temporary identifier (SL-CS-RNTI).

2. The one or more non-transitory computer-readable media of claim 1, wherein the DCI includes a frequency offset bitfield set to all 1's.

3. An apparatus of a next-generation NodeB (gNB) comprising:
    memory to store downlink control information (DCI) associated with a configured grant sidelink transmission by a user equipment (UE), wherein the DCI includes an indication of an activation or a release of a sidelink resource using a hybrid automatic repeat request (HARQ) process number identifier field; and
    processor circuitry, coupled with the memory, to:
        retrieve the DCI from the memory; and
        encode a message for transmission to the UE that includes the DCI scrambled by a sidelink-configured scheduling-radio network temporary identifier (SL-CS-RNTI), wherein the DCI is DCI format 3_0 or 3_1, and wherein the DCI is to indicate the activation of the sidelink resource and the HARQ process number identifier field is set to all 0's or the DCI is to indicate the release and the HARQ process number identifier field is set to all 1's.

4. The apparatus of claim 3, wherein the DCI includes a frequency offset bitfield set to all 1's.

5. One or more non-transitory computer-readable media storing instructions that, when executed by one or more processors, are to cause a user equipment (UE) to:
    receive a message that includes downlink control information (DCI) associated with a configured grant sidelink transmission, wherein the DCI is scrambled by a sidelink-configured scheduling-radio network temporary identifier (SL-CS-RNTI), and wherein the DCI includes an indication of an activation or a release of a sidelink resource using a hybrid automatic repeat request (HARD) process number identifier field; and
    encode a physical sidelink shared channel (PSSCH) or physical sidelink control channel (PSCCH) message for transmission based on the DCI, wherein the DCI is DCI format 3_0 or 3_1, and wherein the DCI is to indicate the activation of the sidelink resource and the HARQ process number identifier field is set to all 0's or the DCI is to indicate the release and the HARQ process number identifier field is set to all 1's.

6. The one or more non-transitory computer-readable media of claim 5, wherein the DCI includes a frequency offset bitfield set to all 1's.

7. One or more non-transitory computer-readable media storing instructions that, when executed by one or more processors, are to cause a user equipment (UE) to:
  receive a message that includes downlink control information (DCI) associated with a configured grant sidelink transmission, wherein the DCI is scrambled by a sidelink-configured scheduling-radio network temporary identifier (SL-CS-RNTI), wherein the DCI is DCI format 3_0 or 3_1, wherein the DCI includes an indication of an activation or a release of a sidelink resource using a hybrid automatic repeat request (HARD) process number identifier field, and wherein if the DCI indicates the release of the sidelink resource the DCI further includes a frequency resource indication field set to all 1's; and
  encode a physical sidelink shared channel (PSSCH) or physical sidelink control channel (PSCCH) message for transmission based on the DCI;
  wherein the DCI is to indicate the activation of the sidelink resource and the HARD process number identifier field is set to all 0's or the DCI is to indicate the release of the sidelink resource and the HARD process number identifier is set to all 1's.

8. One or more non-transitory computer-readable media storing instructions that, when executed by one or more processors, are to cause a next-generation NodeB (gNB) to:
  determine downlink control information (DCI) associated with a configured grant sidelink transmission by a user equipment (UE), wherein the DCI includes an indication of an activation or a release of a sidelink resource using a hybrid automatic repeat request (HARQ) process number identifier field, and wherein if the DCI indicates the release of the sidelink resource the DCI further includes a frequency resource indication field set to all 1's; and
  encode a message for transmission to the UE that includes the DCI scrambled by a sidelink-configured scheduling-radio network temporary identifier (SL-CS-RNTI);
  wherein the DCI is DCI format 3_0 or 3_1; and
  wherein the DCI is to indicate the activation of the sidelink resource and the HARQ process number identifier is set to all 0's or the DCI is to indicate the release of the sidelink resource and the HARQ process number identifier is set to all 1's.

* * * * *

UNITED STATES PATENT AND TRADEMARK OFFICE
CERTIFICATE OF CORRECTION

PATENT NO. : 11,985,670 B2
APPLICATION NO. : 17/175401
DATED : May 14, 2024
INVENTOR(S) : Sergey Panteleev et al.

Page 1 of 1

It is certified that error appears in the above-identified patent and that said Letters Patent is hereby corrected as shown below:

In the Claims

Column 36
Claim 5, Line 56, replace "(HARD)" after "request" and before "process number" with "(HARQ)".

Column 37
Claim 7, Line 12, replace "(HARD)" after "request" and before "process number" with "(HARQ)".

Column 37
Claim 7, Line 20, replace "HARD" after "and the" and before "process number" with "(HARQ)".

Column 37
Claim 7, Line 22, replace "HARD" after "and the" and before "process number" with "(HARQ)".

Signed and Sealed this
Second Day of July, 2024

Katherine Kelly Vidal
*Director of the United States Patent and Trademark Office*